United States Patent
Yamagami et al.

[11] Patent Number: 5,945,227
[45] Date of Patent: Aug. 31, 1999

[54] MAGNETIC HEAD

[75] Inventors: Hiroshi Yamagami; Takashi Saito; Masao Aoki; Kazuhiro Kaneko, all of Niigata-ken, Japan

[73] Assignee: Alps Electric Co., Ltd., Tokyo, Japan

[21] Appl. No.: 08/976,740

[22] Filed: Nov. 24, 1997

[30] Foreign Application Priority Data

Nov. 29, 1996 [JP] Japan .................................. 8-319792

[51] Int. Cl.$^6$ .................................................. G11B 5/66
[52] U.S. Cl. .......................... 428/692; 428/323; 428/328; 428/694 R; 428/694 T; 428/900; 360/113; 360/119; 360/120; 360/126
[58] Field of Search .................................. 428/323, 328, 428/692, 694 R, 800, 694 T; 360/113, 119, 120, 126

[56] References Cited

U.S. PATENT DOCUMENTS

| | | |
|---|---|---|
| 4,246,619 | 1/1981 | Hirai et al. .............................. 360/125 |
| 4,316,228 | 2/1982 | Fujiwara et al. ........................ 360/127 |
| 4,439,794 | 3/1984 | Shiroishi et al. ....................... 360/127 |
| 4,450,494 | 5/1984 | Fujiwara et al. ........................ 360/125 |
| 5,049,209 | 9/1991 | Sakakima et al. ...................... 148/306 |
| 5,117,321 | 5/1992 | Nakanishi et al. ...................... 360/120 |
| 5,218,500 | 6/1993 | Okuda et al. ........................... 360/126 |
| 5,270,894 | 12/1993 | Okuda et al. .......................... 360/126 |
| 5,278,716 | 1/1994 | Okuda et al. ........................... 360/126 |
| 5,515,222 | 5/1996 | Kumagai et al. ....................... 360/127 |
| 5,585,984 | 12/1996 | Hasegawa et al. ..................... 360/113 |

*Primary Examiner*—Leszek Kiliman
*Attorney, Agent, or Firm*—Brinks Hofer Gilson & Lione

[57] ABSTRACT

The absolute values of the apparent magnetocrystalline anisotropic energy K1 is made large to increase the absolute value of the crystal magnetic anisotropy energy by adjusting the content of $Fe_2O_3$ in the single crystal ferrite to 50 to 52 mol % or 55 to 58 mol %, thereby the absolute value of the apparent magnetic anisotropic energy is increased. Accordingly, the magnetic pole at the demagnetization time is stabilized and noise fluctuation is suppressed to a low level.

10 Claims, 10 Drawing Sheets

MAGNETIC HEAD

BACKGROUND OF THE INVENTION

1. Field of the Invention

This invention relates to a magnetic head in which a magnetic gap is formed by a portion of a ferrite core confronting the gap or a magnetic core having MIG (Metal in Gap) structure in which a metal magnetic film is formed at a portion of a ferrite core confronting the gap, and especially relates to a magnetic head being able to suppress noise fluctuation in a high frequency band.

2. Description of the Related Art

FIG. 11 is a perspective view of the conventional magnetic head while FIG. 12 is an enlarged plane view of a magnetic head viewed from the rubbing surface side of a recording medium.

The reference numeral 1 in FIG. 11 is a core made of a single crystal ferrite comprising $Fe_2O_3$, MnO and ZnO or a joined material of the single crystal ferrite with a polycrystalline ferrite. The core 1, 1 is provided with a confronting portion 1a, 1a and an inclined face (track width regulating face) 1b, 1b inclined against the confronting portion 1a, 1a.

A metal magnetic film 2 having a high saturation magnetic flux density such as Fe-Ta-N alloy or Fe-Al-Si alloy (sendust) is coated on the confronting portion 1a 1a and inclined face (track width regulating face) 1b, 1b, wherein the metal magnetic films coated on the confronting portion 1a, 1a are joined with each other via a non-magnetic material to form a magnetic gap G with the junction part. Tw denotes track width.

The reference numeral 3 is an adhering glass to join the metal magnetic film 2, 2 coated on the confronting portion 1a, 1a and the adhering glass 3 is also filled on the surface of the metal magnetic film 2 coated on the core on the inclined face (track width regulating face) 1b, 1b. The reference numeral 4 is a recording/reproducing coil. While the azimuthal angle of the magnetic gap is made 0° in FIG. 12, the practical magnetic head has an azimuthal angle so as to turn the magnetic gap clockwise or counter clockwise against the magnetic circuit direction.

It is generally recognized that the magnetic anisotropy along the crystallographic axis in the single crystal ferrite is determined by the magnetocrystalline anisotropic energy K1 that depends on the composition of the single crystal ferrite. However, the magnetic anisotropy of the magnetic head as shown in FIG. 11 is not only determined by the magnetocrystalline anisotropic energy K1 but also depends on the apparent magnetic anisotropic energy Ea obtained by subtracting the magnetoelastic energy that is proportional to the product of stress $\sigma_{total}$ times saturation magnetorestriction $\lambda s$ from the magnetocrystalline anisotropic energy K1.

Apparent magnetic anisotropic energy; Ea= (Magnetocrystalline anisotropic energy; K1)– (Magnetoelastic energy; $3/2 \cdot \lambda s \cdot \sigma_{total}$)

Magnetic anisotropy will be strengthened when the absolute value of Ea becomes large while the former will be weak when the latter is small.

Ea was usually made as small as possible to enhance the magnetic permeability $\mu$ that is inversely proportional to Ea as high as possible in the conventional magnetic heads. Accordingly, the absolute value of the magnetoelastic energy was reduced by making the absolute value of the magnetocrystalline anisotropic energy K1 as well as the absolute values of the saturation magnetorestriction $\lambda s$ and stress $\sigma_{total}$ small for the purpose of diminishing Ea described above.

The magnetocrystalline anisotropic energy K1 and saturation magnetorestriction $\lambda s$ are mainly determined by the content of $Fe_2O_3$ in the ferrite. On the other hand, the mean thermal expansion coefficient $\alpha_{ferrite}$ of the single crystal ferrite is largely dependent on the Zn content, thereby the absolute value of stress $\sigma_{total}$ can be reduced by making the difference between the mean thermal expansion coefficient $\alpha_{metal}$ of the soft magnetic material forming the metal magnetic film 2 and the mean thermal expansion coefficient $\alpha_{ferrite}$ of the single crystal ferrite small. The mean thermal expansion coefficient $\alpha_{metal}$ of sendust that is used for the conventional metal magnetic film 2 is about 115 ($10^{-7}/°$ C.)

FIG. 3 is a three components phase diagram of a single crystal ferrite comprising $Fe_2O_3$ MnO and ZnO. The composition ratio of the single crystal ferrite by which the absolute values of the magnetocrystalline anisotropic energy K1, saturation magnetorestriction $\lambda s$ and stress $\sigma_{total}$ are made small is represented by (a) in the figure where the ratio of ($Fe_2O_3$:MnO:ZnO)=(53 to 55 mol % 26 to 31 mol %:16 to 19 mol %). Cores 1, 1 of the conventional magnetic head were formed by single crystal ferrites with a composition within the area of (a).

However, when a magnetic head in which the absolute values of the magnetocrystalline anisotropic energy K1 and magnetoelastic energy are made small to diminish the apparent magnetic anisotropic energy Ea was used for recording/reproduction at a high frequency for DDS (Digital Data Storage), it was confirmed that noise fluctuations at frequencies other than the frequency of the carrier signal became large and C/N ratio (the ratio between the carrier recording level and noise level) was deteriorated, thereby the error rate was increased.

The reason why the noise fluctuation is enlarged is supposed as follows: The magnetized state in the core, in which the absolute value of the magnetic anisotropy energy Ea is diminished, is made to be readily fluctuated by the influence of the exciting current during recording, so that the magnetic energy in the ferrite becomes unstable in the demagnetization time when the polarity of the alternating magnetic field imparted to the core is instantaneously quenched and thereby the magnetic polarity in the vicinity of the gap at the moment of demagnetization becomes unstable. This probably means that the polarity of the apparent magnetic anisotropy energy Ea is so susceptible to the exciting current for recording.

SUMMARY OF THE INVENTION

Accordingly, the object of the present invention is to provide a magnetic head, in which the C/N ratio can be improved by stabilizing the energy state in the core at the moment of demagnetization when the polarity of the alternating magnetic field is instantaneously quenched thereby suppressing the noise fluctuation, for solving the problems in the prior art noted above.

In one aspect, the present invention provides a magnetic head in which a magnetic gap is formed by a portion confronting the gap formed by a pair of cores at least the portion confronting the gap of which is made of a single crystal ferrite; the adhesive material for joining this confronting portion is filled into side portions of the core; the single crystal ferrite is composed of $Fe_2O_3$, MnO and ZnO; the proportion of $Fe_2O_3$ in the single crystal ferrite is 50 to 52 mol % or 55 to 58 mol %; and the adhering material for joining the confronting portion is filled into the side portion of the core, wherein the absolute value of the crystal magnetic anisotropy energy of the single crystal ferrite is in the range of 200 j/m³ to 600 j/m³.

The magnetic head according to this invention can effectively display a suppression effect for noise fluctuation even when a metal magnetic film is not formed on the portion confronting the core of the magnetic head.

By forming a metal magnetic film 2' with a soft magnetic characteristic described in (1) and (2) below on the portion of the core confronting the gap, a magnetic head being excellent in high recording quality, high reproduction output level and high reliability can be constructed. However, it is preferable in this case to adjust the content of ZnO in the ferrite to 8 to 16 mol %.

(1) The soft magnetic material comprises a composition formula represented by $Fe_{(100-a-b-c-d)}$-$X_a$-$M_b$-$Z_c$-$T_d$ where X is either one of Si and Al or both of them, M is at least one kind of metal selected from the metal group comprising Zr, Hf, Nb and Ta, Z is either one of C and N or both of them and T represents at least one kind of metal selected from the metal group comprising Cr, Ti, Re, Ru, Rh, Ni, Co, Pd, Pt and Au, wherein a, b, c and d are in the range of $0.5 \leq a \leq 25$ (atomic %), $1 \leq b \leq 10$ (atomic %), $0.5 \leq c \leq 15$ (atomic %) and $0 \leq d \leq 10$ (atomic %), respectively, with a balance of Fe in atomic %, and contains carbides or nitride of the metal group M.

(2) The soft magnetic material comprises a composition formula represented by $Fe_{(100-e-f-b-c-d)}$-$Si_e$-$Al_f$-$M_b$-$Z_c$-$T_d$ where M is at least one kind of metal selected from the metal group comprising Zr, Hf, Nb and Ta, Z is either one of C and N or both of them and T represents at least one kind of metal selected from the metal group comprising Cr, Ti, Re, Ru, Rh, Ni, Co, Pd, Pt and Au, wherein e, f, b, c, and d are in the range of $8 \leq e \leq 15$ (atomic %), $0.5 \leq f \leq 10$ (atomic %), $1 \leq b \leq 10$ (atomic %), $0.5 \leq c \leq 15$ (atomic %) and $0 \leq d \leq 10$ (atomic %), respectively, with a balance of Fe in atomic %, and contains carbides or nitride of the metal group M.

In another aspect, the present invention provides a magnetic head in which a magnetic gap is formed by a portion confronting the gap formed by a pair of cores at least the portion confronting the gap of which is made of a single crystal ferrite; the adhesive material for joining this confronting portion is filled into side portions of the core; the single crystal ferrite is composed of $Fe_2O_3$, MnO and ZnO; the proportion of $Fe_2O_3$ in the single crystal ferrite is 50 to 52 mol % or 55 to 58 mol %; a metal magnetic film is formed at the portion confronting the core by the soft magnetic material described below; a magnetic gap is formed confronting this metal magnetic film and the ZnO content in the ferrite is 8 to 16 mol %.

The metal magnetic film comprises a composition formula represented by $Fe_{(100-a-b-c-d)}$-$X_a$-$M_b$-$Z_c$-$T_d$ where X is either one of Si and Al or both of them, M is at least one kind of metal selected from the metal group comprising Zr, Hf, Nb and Ta, Z is either one of C and N or both of them and T represents at least one kind of metal selected from the metal group comprising Cr, Ti, Re, Ru, Rh, Ni, Co, Pd, Pt and Au, wherein a, b, c and d are in the range of $0.5 \leq a \leq 25$ (atomic %), $1 \leq b \leq 10$ (atomic %), $0.5 \leq c \leq 15$ (atomic %) and $0 \leq d \leq 10$ (atomic %), respectively, with a balance of Fe in atomic %, and contains carbides or nitride of the metal group M.

In a further aspect, the present invention provides a magnetic head in which a magnetic gap is formed by a portion confronting the gap formed by a pair of cores at least the portion confronting the gap of which is made of a single crystal ferrite; the adhesive material for joining this confronting portion is filled into side portions of the core; the single crystal ferrite is composed of $Fe_2O_3$, MnO and ZnO; the proportion of $Fe_2O_3$ in the single crystal ferrite is 50 to 52 mol % or 55 to 58 mol %; a metal magnetic film is formed at the portion confronting the core by the soft magnetic material described below; a magnetic gap is formed confronting this metal magnetic film and the ZnO content in the ferrite is 8 to 16 mol %.

The soft magnetic material comprises a composition formula represented by $Fe_{(100-e-f-b-c-d)}$-$Si_e$-$Al_f$-$M_b$-$Z_c$-$T_d$ where M is at least one kind of metal selected from the metal group comprising Zr, Hf, Nb and Ta, Z is either one of C and N or both of them and T represents at least one kind of metal selected from the metal group comprising Cr, Ti, Re, Ru, Rh, Ni, Co, Pd, Pt and Au, wherein e, f, b, c and d are in the range of $8 \leq e \leq 15$ (atomic %), $0.5 \leq f \leq 10$ (atomic %), $1 \leq b \leq 10$ (atomic %), $0.5 \leq c \leq 15$ (atomic %) and $0 \leq d \leq 10$ (atomic %), respectively, with a balance of Fe in atomic %, and contains carbide or nitride of the metal group M.

The magnetic head according to this invention is so constructed as to enable to improve the C/N ratio and suppress the error rate at a high frequency region when it is used for DDS (Digital Data Storage) by which recording/reproducing is carried out with digital signals.

Noise fluctuation should be suppressed to improve the C/N ratio. It was confirmed in this experiment by the inventors that the absolute value of magnetocrystalline anisotropic energy K1 may be increased to suppress the noise fluctuation.

The absolute value of the apparent magnetic anisotropic energy Ea obtained by subtracting the magnetoelastic energy that is proportional to the product of stress $\sigma_{total}$ times saturation magnetorestriction $\lambda s$ from the magnetocrystalline anisotropic energy K1 can be made large when the absolute value of the magnetocrystalline anisotropic energy K1 is increased. Fluctuations in the magnetized state in the core when an exciting current for recording is imparted can be suppressed by making the absolute value of the apparent magnetic anisotropic energy Ea large, thereby the magnetic energy in the core is stabilized at the moment of demagnetization when the polarity of the alternating magnetic field flowing through the core is instantaneously quenched thus enabling to suppress the noise level relative to the carrier signal.

For the purpose of increasing the absolute value of the magnetocrystalline anisotropic energy K1 of the ferrite constituting the core, a slightly larger or a slightly smaller ranges than the conventional range, that is the range indicated by (b) or (c) in FIG. 3, was selected as a composition ratio of $Fe_2O_3$ in the single crystal ferrite.

However, when the content of $Fe_2O_3$ is selected to make the absolute value of the magnetocrystalline anisotropic energy K1 large, not only K1 but also the absolute value of the saturation magnetorestriction $\lambda s$ that depends on the $Fe_2O_3$ content becomes large. Accordingly, it is required that the differences in the mean thermal expansion coefficients between the joining glass and core is made as small as possible, the difference between the metal magnetic film and core being also made as small as possible when a metal magnetic film is formed in the MIG head, and the stress $\sigma_{total}$ applied to the gap forming portion of the core is diminished to as low level as possible. Reducing the difference between the mean thermal expansion coefficients makes it possible to diminish the absolute value of the magnetoelastic energy that is proportional to the product of stress $\sigma_{total}$ times saturation magnetorestriction $\lambda s$ to its limit while making the absolute value of the apparent magnetic anisotropic energy Ea obtained by subtracting the magnetoelastic energy from the magnetocrystalline anisotropic energy K1 as large as possible. When the signs of the magnetic anisotropic energy Ea and magnetoelastic energy are positively or negatively inverted with each other, it is made possible to prevent the head output level from being lowered more than necessary due to lowering of the magnetic permeability as a result of an excessive increase of the absolute value of the magnetic anisotropic energy Ea by making the absolute value of the magnetoelastic energy small.

By the measures noted above, the object of this invention that the energy state in the core should be stabilized in the demagnetization state can be achieved.

For the purpose of making the difference between the mean thermal expansion coefficient $\alpha_{ferrite}$, and the mean thermal expansion coefficient $\alpha_{metal}$ of the soft magnetic material that constitute the metal magnetic film 2 and that of the joining glass (adhering material) as small as possible, the mean thermal expansion coefficient $\sigma_{ferrite}$ of the ferrite should be adjusted close to those of the metal magnetic film 2 and joining glass (adhering material). The mean thermal expansion coefficient of ferrite is adjustable by varying the content of ZnO in the ferrite.

The requirement of high recording quality, high reproduction output level and high reliability can be attained by using the soft magnetic material previously described in (1) and (2) as the metal magnetic film 2 in the magnetic head having a MIG construction. However, since the foregoing soft magnetic material in (1) and (2) has a higher mean thermal expansion coefficient than ferrites such as sendust, the thermal expansion coefficient of ferrites should be adjusted to a high level by adjusting the content of ZnO to 8 to 16 mol %.

DESCRIPTION OF THE PREFERRED EMBODIMENT

Figure 1:
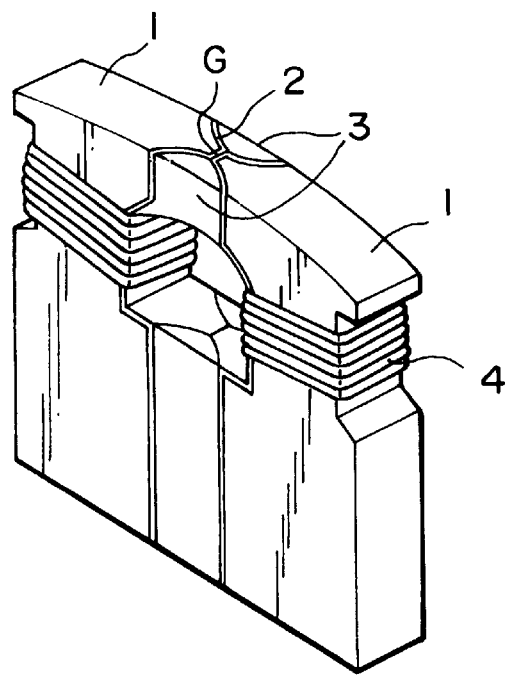
FIG. 1 is a perspective view of the magnetic head.
Figure 2:
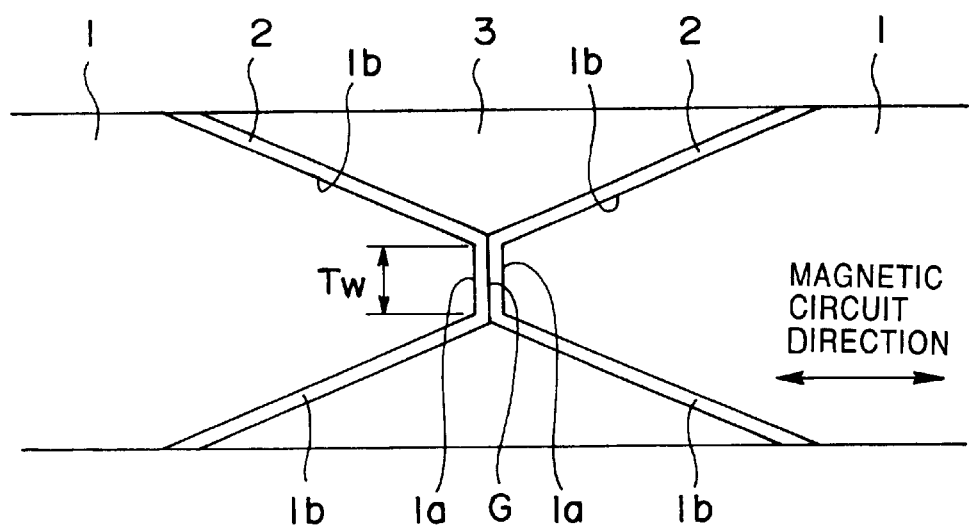
FIG. 2 is an enlarged plane view in the vicinity of the gap portion of the magnetic head viewed from the rubbing surface.

FIG. 1 is a perspective view of a magnetic head according to this invention while FIG. 2 is an enlarged plane view of the magnetic head according to this invention viewed from the rubbing face side of the recording medium.

The magnetic head core 1, 1 shown in FIG. 1 and FIG. 2 is formed from a Mn—Zn single crystal ferrite produced by molding and sintering a mixture of $Fe_2O_3$, MnO and ZnO in a prescribed mixing ratio, or from a joined material of the single crystal ferrite with a polycrystalline ferrite, at least the portion confronting a gap being formed with the single crystal ferrite.

A inclined face (track width regulating face) 1b, 1b inclined against the portion confronting the gap 1a, 1a and direction of magnetic current is formed at the terminal of the core 1, 1, and a metal magnetic film 2 made of a soft magnetic material comprising iron fine crystals is coated on the portion confronting the gap 1a, 1a and inclined face (track width regulating face) 1b, 1b. The metal magnetic film 2 may be only formed on the portion confronting the gap 1a, 1a.

It is preferable that one of the following two kind of soft magnetic materials is used as the metal magnetic film 2 in this invention.

(1) The soft magnetic material comprises a composition formula represented by $Fe_{(100-a-b-c-d)}$-$X_a$-$M_b$-$Z_c$-$T_d$ where X is either one of Si and Al or both of them, M is at least one kind of metal selected from the metal group comprising Zr, Hf, Nb and Ta, Z is either one of C and N or both of them and T represents at least one kind of metal selected from the metal group comprising Cr, Ti, Re, Ru, Rh, Ni, Co, Pd, Pt and Au, wherein a, b, c and d are in the range of $0.5 \leq a \leq 25$ (atomic %), $1 \leq b \leq 10$ (atomic %), $0.5 \leq c \leq 15$ (atomic %) and $0 \leq d \leq 10$ (atomic %), respectively, with a balance of Fe in atomic %, and contains carbides or nitride of the metal group M.

(2) The soft magnetic material comprises a composition formula represented by $Fe_{(100-e-f-b-c-d)}$-$Si_e$-$Al_f$-$M_b$-$Z_c$-$T_d$ where M is at least one kind of metal selected from the metal group comprising Zr, Hf, Nb and Ta, Z is either one of C and N or both of them and T represents at least one kind of metal selected from the metal group comprising Cr, Ti, Re, Ru, Rh, Ni, Co, Pd, Pt and Au, wherein e, f, b, c and d are in the range of $8 \leq e \leq 15$ (atomic %), $0.5 \leq f \leq 10$ (atomic %), $1 \leq b \leq 10$ (atomic %), $0.5 \leq c \leq 15$ (atomic %) and $0 \leq d \leq 10$ (atomic %), respectively, with a balance of Fe in atomic %, and contains carbides or nitride of the metal group M.

In the soft magnetic material described above, Fe is a main component that is responsible for magnetism. The grains comprising carbides or nitrides of the metal group M described above has such effects as to suppress growth and coarsening of the crystals containing Fe as a main component and to improve heat resistance of the soft magnetic material. While it is preferable that the amount of added the metal group M is 1 mol % or more, a proportion of 10 mol % or more is not preferable because the saturation magnetic flux density Bs is decreased.

C or N serves for forming carbides or nitrides by bonding with the metal group M. While it is preferable that the amount of added C or N is 0.5 mol % or more, a proportion of 15 mol % or more is not preferable because the saturation magnetic flux density Bs is decreased.

An addition of Al is effective for (i) improving environmental resistance, (ii) increasing the resistivity by forming a solid solution of Al in the Fe crystal and (iii) retarding the growth of crystal grains besides decreasing the magnetocrystalline anisotropic energy and increasing the thermal resistance temperature.

While it is preferable that the addition amount of Al is 0.5 mol % or more, an amount of 25 mol % or more is not preferable since the saturation magnetorestriction λs becomes too large and saturation magnetic flux density Bs is decreased.

An addition of Si is effective for (i) decreasing the saturation magnetorestriction λs once increased by adding Al and (ii) allowing the magnetic film to be easily made amorphous during sputtering. Although a large amount of carbides or nitrides were incorporated to allow the magnetic film to be easily made amorphous in the conventional art, the addition of Si enables to reduce the amount of carbides or nitrides while suppressing the decrease of the saturation magnetic flux density Bs due to carbides or nitrides. The addition of Si also effective for (iii) increasing the resistivity by forming a solid solution of Si in the crystal of Fe and (iv) retarding the growth of crystal grains besides decreasing the magnetocrystalline anisotropic energy and increasing the heat resistant temperature.

While it is preferable that the amount of addition of Si is 0.5 mol % or more, an amount of 25 mol % or more is not preferable since the saturation magnetic flux density Bs is decreased.

When Si is added together with Al, the saturation magnetorestriction λs is suppressed to 0 to $3.0 \times 10^{-6}$ as well as improving the environmental resistance, although it is preferable to adjust (Si/Al) to 3/2 or more for the purpose to allow the saturation magnetorestriction λs to be more decreased.

The magnetic materials described in (1) and (2) have magnetic characteristics such as (i) a low magnetorestriction, (ii) a high saturation magnetic flux density, (iii) a high magnetic permeability and (iv) a high reliability in that the material do not cause any rust or color changes after immersing it in brine (0.9%) for 24 hours and has a good corrosion resistance.

Accordingly, various characteristics of the magnetic head can be improved when the soft magnetic materials described in (1) and (2) are used for the material of the metal magnetic film 2. However, the magnetic head according to this invention is not necessarily formed from the soft magnetic materials in (1) and (2), but conventional soft magnetic materials such as Fe-Ta-N alloys or Fe-Al-Si alloys (sendust) may be used.

The reference numeral 3 is an adhering glass for joining the metal magnetic films 2, 2 coated on the portion confronting the gap 1a, 1a together, the adhering glass 3 being filled between the metal magnetic films 2, 2 coated on the inclined face (track width regulation face) 1b, 1b. When the metal magnetic film 2 is not formed on the inclined face 1b, 1b, the adhering glass is directly filled onto the core surface 1. The junction portion forms a magnetic gap G and Tw represents a track width. The reference numeral 4 represents a reproduction coil.

The magnetic coil having a MIG (Metal in Gap) structure is used for DDS (Digital Data Storage) for recording/ reproduction with a digital signal at a high frequency band of several MHz to 10 MHz.

Figure 3:
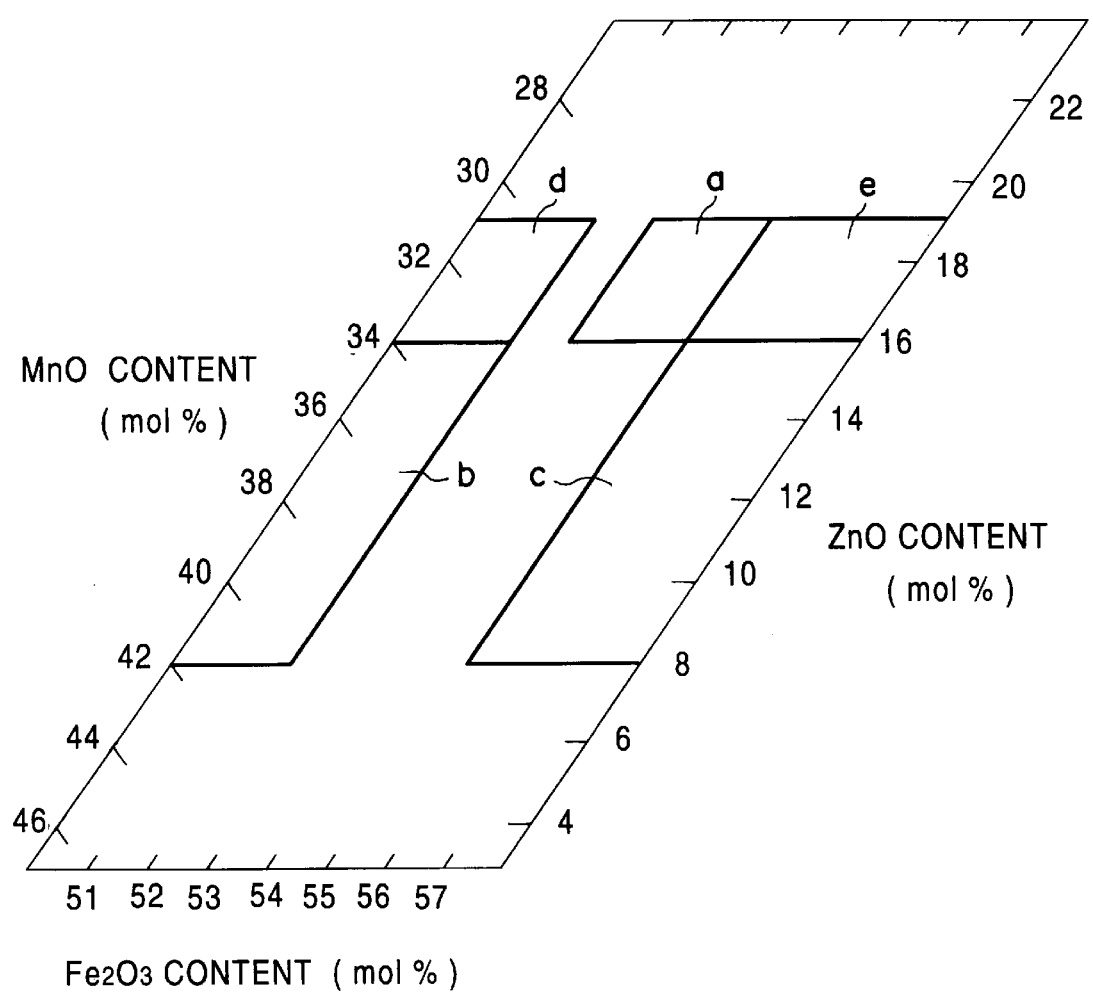
FIG. 3 is a three components phase diagram of the ferrite single crystal material composed of $Fe_2O_3$, MnO and ZnO.

FIG. 3 is a three components phase diagram indicating the composition ratio of a ferrite comprising $Fe_2O_3$, MnO and ZnO. When the soft magnetic material described in foregoing (1) or (2) is used for the metal magnetic film 2, it is preferable that the composition ratio of the single crystal ferrite to be used for the core 1, 1 is within the area of the composition ratio of ($Fe_2O_3$:MnO:ZnO)=(50 to 52 mol %:32 to 42 mol % :8 to 16 mol %) in (b) of the figure, or within the area of the composition ratio of ($Fe_2O_3$:MnO:ZnO)=(55 to 58 mol %:26 to 37 mol % :8 to 16 mol %) in (c) of the figure.

When conventionally used soft magnetic materials such as sendust are used for the metal magnetic film 2, it is preferable that the composition ratio of the single crystal ferrite to be used for the core 1, 1 is within the area of the composition ratio of ($Fe_2O_3$:MnO:ZnO)=(50 to 52 mol %:29 to 34 mol % :16 to 19 mol %) in (d) of the figure, or within the area of the composition ratio of ($Fe_2O_3$:MnO:ZnO)= (55to 58 mol %:23 to 29 mol % :16 to 19 mol %) in (e) of the figure.

In the single crystal ferrite, the magnetocrystalline anisotropic energy K1, saturation magnetorestriction λs and thermal expansion coefficient $\alpha_{ferrite}$ are determined by selecting the composition ratio in the three components phase diagram shown in FIG. 3.

Both of the magnetocrystalline anisotropic energy K1 and saturation magnetorestriction λs are strongly influenced by the content of $Fe_2O_3$ in the ferrite. The absolute values of K1 and λs will be minimum when the $Fe_2O_3$ content is about 53 mol % while the absolute value of the magnetocrystalline anisotropic energy K1 will be increased to an extent of 200 $J/m^3$ to 600 $J/m^3$ when the contents of $Fe_2O_3$ is 50 to 52 mol % or 55 to 58 mol % that are the composition ratios according to this invention. The absolute value of the saturation magnetorestriction λs is also increased in this range of the composition ratio.

The thermal expansion coefficient $\alpha_{ferrite}$ is mainly determined by mol % of ZnO in the ferrite. When the ZnO content is 8 to 16 mol % (within the range of (b) or (c) in FIG. 3), the mean thermal expansion coefficient $\alpha_{ferrite}$ of the ferrite in the temperature range of 100° C. to 300 ° C. will be in the range of 120 to 140 ($10^{-7}$/° C). On the other hand, when the ZnO content is 16 to 19 mol % (within the range of (d) or (e) in FIG. 3), the mean thermal expansion coefficient $\alpha_{ferrite}$ of the ferrite in the temperature range of 100° C. to 300° C. will be in the range of 115 to 120 ($10^{-7}$/° C.).

The mean thermal expansion coefficient $\alpha_{metal}$ of the soft magnetic material in (1) or (2) described above is 125 to 150 ($10^{-7}$/° C.) in the temperature range of 100° C. to 300° C. Accordingly, the difference between the mean thermal expansion coefficient $\alpha_{metal}$ of the soft magnetic material to be used for the metal magnetic film 2 and the mean thermal expansion coefficient $\alpha_{ferrite}$ of the ferrite can be diminished by using the single crystal ferrite having a composition ratio within the area (b) and (c) in FIG. 3 where the mean thermal expansion coefficient $\alpha_{ferrite}$ of the ferrite is 120 to 140 ($10^{-7}$/° C.), thereby the absolute value of the stress atotal applied along the direction of the magnetic current flow path of the core 1, 1 in the vicinity of the gap can be made as small as possible.

The mean thermal expansion coefficient $\alpha_{metal}$ of soft magnetic materials such as Fe-Ta-N alloys or sendust is about 115 ($10^{-7}$/° C.) in the temperature range of 100° C. to 300° C. Therefore, when a metal magnetic film is formed with a soft magnetic material such as sendust, the difference between the thermal expansion coefficients $\alpha_{metal}$ of the soft magnetic material and $\alpha_{ferrite}$ of the ferrite can be diminished while making the absolute value of the stress $\sigma_{total}$ applied along the direction of the magnetic current flow path of the core 1, 1 in the vicinity of the gap as small as possible by using the single crystal ferrite having a composition ratio within the range of (d) or (e) in FIG. 3 where the mean thermal expansion coefficient $\alpha_{ferrite}$ is 115 to 120 ($10^{-7}$/° C.) as the core 1, 1.

The magnetic anisotropy of the magnetic head shown in FIG. 1 is supposed to depend on the magnetic anisotropic energy Ea obtained by subtracting the magnetoelastic energy that is proportional to the product of stress $\sigma_{total}$ times saturation magnetorestriction λs from the magnetocrystalline anisotropic energy K1.

Magnetic anisotropic energy Ea=(Magnetocrystalline anisotropic energy; K1)–(Magnetoelastic energy; 3/2·λs $\sigma_{total}$)

In this invention, the absolute value of the apparent magnetic anisotropic energy Ea is made large by increasing the absolute value of the magnetocrystalline anisotropic energy K1. By increasing the absolute value of the apparent magnetic anisotropic energy Ea, the polarity of this Ea is stabilized at the demagnetization time when the polarity of the exciting current during recording is instantaneously quenched. That is, the easy axis of magnetization is made not to be readily fluctuated thereby making the inner energy state of the single crystal ferrite to be hardly varied. As a result, magnetization in the core is stabilized at a demagnetization time when the polarities of the exciting current and alternating magnetic field is instantaneously quenched if recording is carried out at a high frequency alternating magnetic field, improving the C/N ratio (the ratio between the signal level and noise level). Improvement in the C/N ratio makes it possible to diminish the error rate during recording/reproduction of digital signals at a high frequency.

As is evident from the discussions above, the absolute value of the apparent magnetic anisotropic energy Ea is set within a proper range larger than the conventional value in this invention. For this purpose, the magnetocrystalline anisotropic energy K1 is also set within a proper range higher than the conventional value by selecting the composition ratio of $Fe_2O_3$ as described previously. Meanwhile, the apparent magnetic anisotropic energy Ea is obtained by subtracting the magnetoelastic energy from the magnetocrystalline anisotropic energy K1. Accordingly, even when the magnetocrystalline anisotropic energy K1 is set within a proper range, the absolute value of the apparent magnetic anisotropic energy Ea would fluctuate depending on the absolute value of the magnetoelastic energy. Therefore, magnetization at the demagnetization time is stabilized to suppress the noise fluctuation width by reducing the absolute value of the magnetoelastic energy thereby making the absolute value of the apparent magnetic anisotropic energy Ea smaller than the desirable range in the preferred embodiment according to this invention. Furthermore, aforementioned Ea is also limited not to exceed the required level to at least prevent the head output from being reduced due to decrease in the magnetic permeability.

The point under discussion will be explained hereinafter in more detail. When the signs of the magnetocrystalline anisotropic energy K1 and magnetoelastic energy are the same with each other, the apparent magnetic anisotropic energy Ea can be made large by reducing the absolute value of the magnetoelastic energy, thus enabling to set the apparent magnetic anisotropic energy Ea approximately depending on the value of the magnetocrystalline anisotropic energy K1 that has been determined within a proper range.

When a range where the absolute value of the magnetocrystalline anisotropic energy K1 becomes large is selected as shown in (b) and (c) of the three components phase diagram in FIG. 3, the absolute value of the saturation magnetorestriction λs is also increased. With a proper selection of this composition range, the saturation magnetorestriction λs becomes positive if the magnetocrystalline anisotropic energy K1 takes a positive sign while the saturation magnetorestriction λs becomes negative if K1 value is negative. The stress $\sigma_{total}$ that act on the core is, on the other hand, always negative. Accordingly, the magnetoelastic energy is negative when K1 is positive while the former is positive when the latter is negative. Since Ea is determined by subtracting the magnetoelastic energy from K1, the absolute value of the apparent magnetic anisotropic energy Ea is equal to the sum of the absolute values of the magnetocrystalline anisotropic energy K1 and magnetoelastic energy in the combination of signs described above. Therefore, even when the magnetoelastic energy K1 is limited within a proper range by selecting the content of $Fe_2O_3$, the absolute value of the apparent magnetic anisotropic energy Ea is made large when the magnetoelastic energy is increased, resulting in a decrease in the magnetic permeability hence lowering of the head output level.

From the results discussed above, it is concluded that the absolute value of the magnetoelastic energy that is proportional to the product of the saturation magnetorestriction λs times stress $\sigma_{total}$ should be diminished by reducing the stress $\sigma_{total}$, since the saturation magnetorestriction λs is increased when the magnetocrystalline anisotropic energy K1 is made to a comparatively high value by a selection of the $Fe_2O_3$ content.

Therefore, the content of $Fe_2O_3$ is selected so as to adjust the magnetocrystalline anisotropic energy K1 in a considerably large range, besides the mean thermal expansion coefficient of the single crystal ferrite is adjusted close to the mean thermal expansion coefficient of the metal magnetic film composed of various kind of soft magnetic materials as described previously to reduce the stress $\sigma_{total}$ thereby to make the absolute value of the magnetoelastic energy small.

By the measures above, noise fluctuation can be controlled by making the apparent magnetic anisotropic energy Ea larger than the conventional ones besides Ea is controlled not to be too large apparent magnetic anisotropic energy Ea to prevent the head output level to be decreased.

As hitherto described, the apparent magnetic anisotropic energy Ea depends on the magnetocrystalline anisotropic energy K1 and magnetoelastic energy. Although it is theoretically possible to control the characteristics of the magnetic head by adjusting the magnetoelastic energy, an appropriate adjustment of the magnetoelastic energy by decreasing the stress $\sigma^{total}$ is difficult to apply in the production process. Therefore, the apparent magnetic anisotropic energy is made large in this invention by at least increasing the magnetocrystalline anisotropic energy K1 that can be readily adjusted.

EXAMPLE

Examples of the magnetic head having a MIG structure are described hereinafter.

The magnetic heads used in the experiments were produced by the same methods below:

(i) The magnetic head was formed along so called β azimuth wherein the portion confronting the gap is aligned with the (100) crystal plane and the tape rubbing face is aligned with the (110) crystal plane.

(ii) The soft magnetic materials described in (1) and (2) above were used for the metal magnetic film 2.

(iii) The track width, gap depth and gap length were adjusted to 12 μm, 14 to 17 μm, and 0.2 μm, respectively, with an azimuth angle of 20°.

Several magnetic heads having different composition ratios of the single crystal ferrite were produced and the magnetocrystalline anisotropic energy K1, effective magnetic permeability $\mu'$ at 1 MHz, mean thermal expansion coefficient $\alpha_{ferrite}$ at a temperature range of 100° C. to 300 ° C. and noise fluctuation width of each magnetic head were measured.

Figure 4:
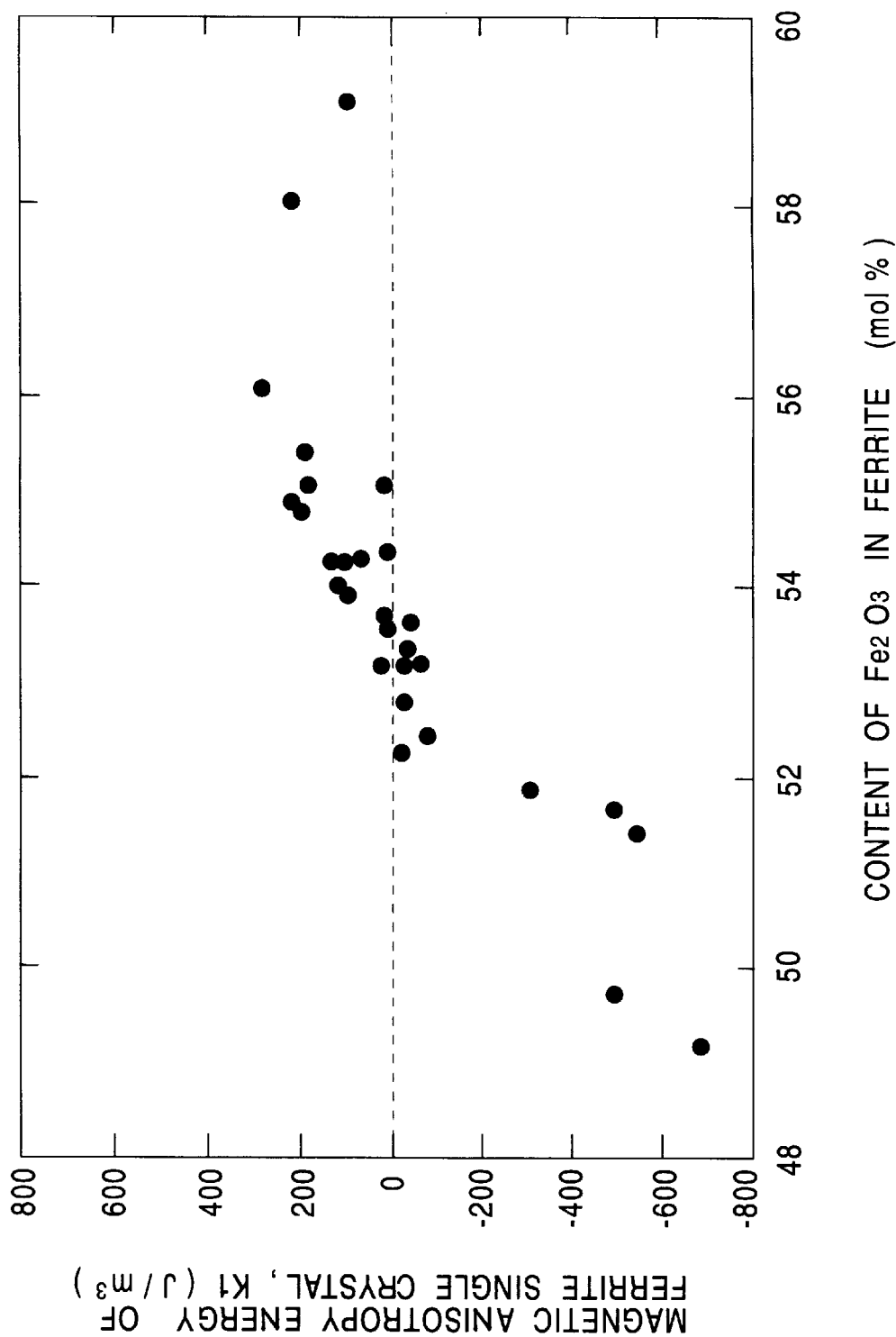
FIG. 4 is a graph showing the relation between the content of $Fe_2O_3$ in the ferrite and magnetocrystalline anisotropic energy K1.

FIG. 4 is a graph showing the relation between the content of $Fe_2O_3$ in the ferrite and magnetocrystalline anisotropic energy K1.

As shown in the figure, the absolute value of K1 is minimum at the $Fe_2O_3$ content of about 53 mol % and the absolute value of K1 becomes large as the content of $Fe_2O_3$ goes away from 53 mol %. However, K1 becomes small when the content of $Fe_2O_3$ comes close to 60 mol %.

Figure 5:
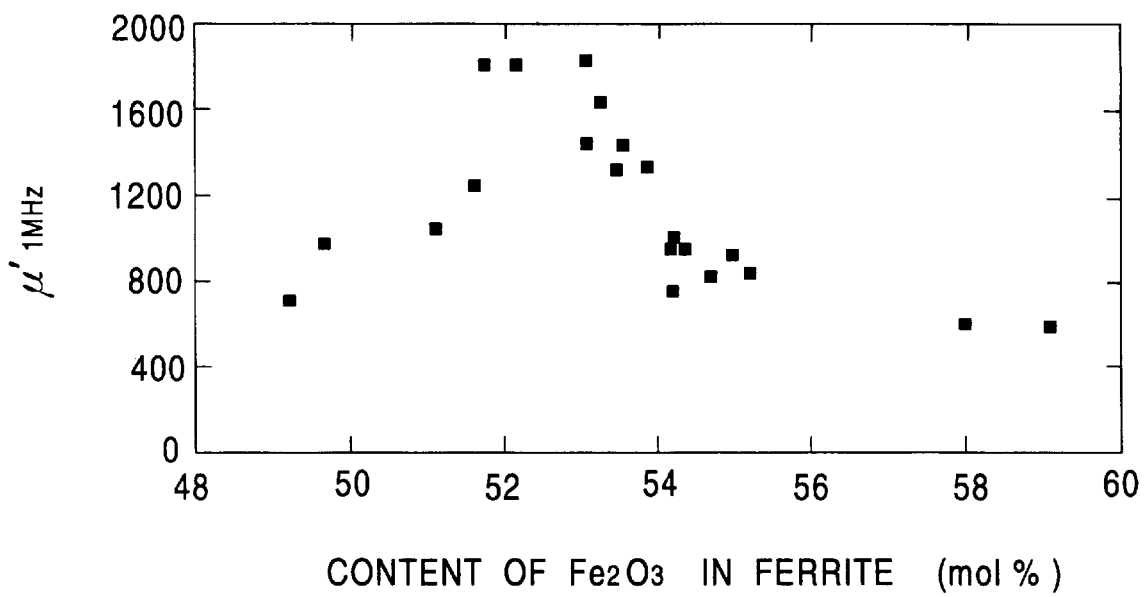
FIG. 5 is a graph showing the relation between the content of $Fe_2O_3$ in the ferrite and effective magnetic permeability $\mu'$ at 1 MHz.

FIG. 5 is a graph showing the relation between the content of $Fe_2O_3$ in the ferrite and effective magnetic permeability $\mu'$.

As shown in the figure, the effective magnetic permeability $\mu'$ is the largest at a $Fe_2O_3$ content of about 53 mol % and the effective magnetic permeability $\mu'$ is reduced as the content of $Fe_2O_3$ goes away from 53 mol %. This indicates that the magnetocrystalline anisotropic energy K1 shown in FIG. 4 is inversely proportional to the effective magnetic permeability $\mu'$.

Figure 6:
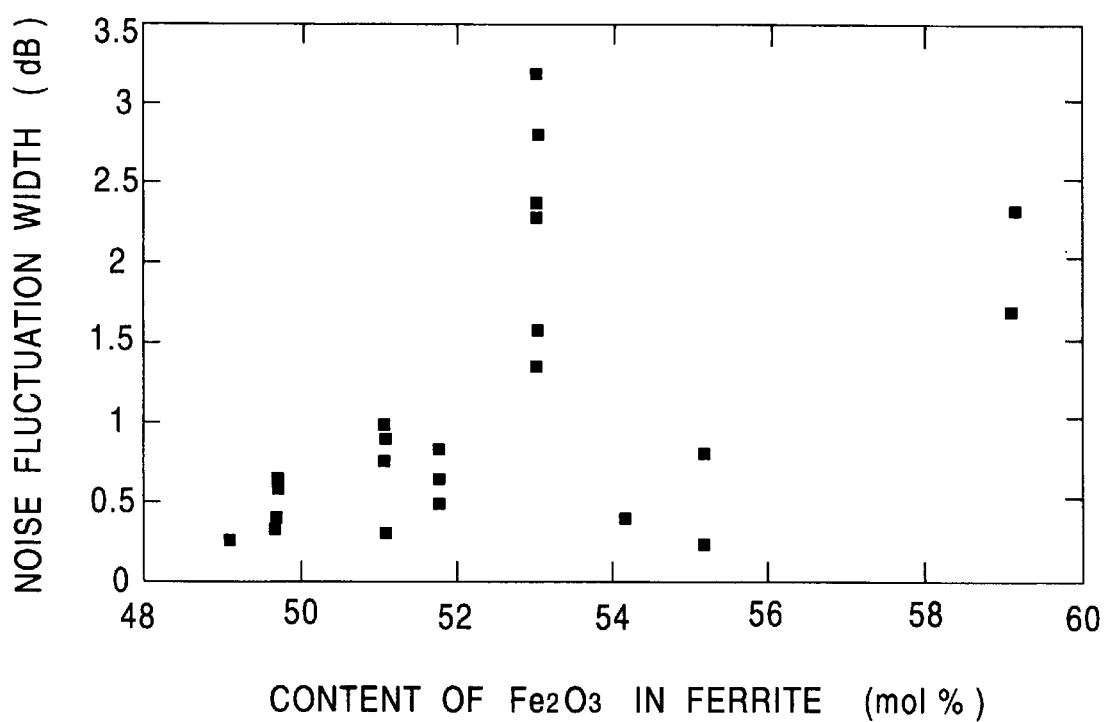
FIG. 6 is a graph showing the relation between the content of $Fe_2O_3$ in the ferrite and noise fluctuation width (dB).

FIG. 6 is a graph showing the relation between the content of $Fe_2O_3$ in the ferrite and noise fluctuation width (dB). Carrier signals at 10 MHz were actually recorded and reproduced on a magnetic tape to measure the noise fluctuation at 8 MHz.

As shown in the figure, the noise fluctuation width (dB) shows a peak when the content of $Fe_2O_3$ is about 53 mol %. The noise fluctuation width (dB) is also protruded when the content of $Fe_2O_3$ is about 59 mol %. From these results, it can be confirmed that the larger the absolute value of the magnetocrystalline anisotropic energy K1 is, the noise fluctuation width becomes smaller. That is, the noise fluctuation width is decreased when the magnetocrystalline anisotropic energy K1 is increased because the absolute value of the apparent magnetic anisotropic energy Ea becomes large thereby the polarity of Ea at a demagnetization time is stabilized.

While the noise fluctuation width (dB) determined at a $Fe_2O_3$ content other than about 53 mol % and 59 mol % is 1 dB or less as shown in FIG. 6, the $Fe_2O_3$ content where the absolute value of the magnetocrystalline anisotropic energy K1 is 200 $J/m^3$ or more is selected so as to surely make the noise fluctuation width 1 dB or less in this invention. It can be understood from FIG. 4 that the $Fe_2O_3$ content in the ferrite where the absolute value of the magnetocrystalline anisotropic energy K1 surely becomes 200 $J/m^3$ or more is 52 mol % or less or 55 to 58 mol %. Though adjusting the $Fe_2O_3$ content within this range enables to suppress the noise fluctuation width (dB) below 1 dB, the absolute value of the apparent magnetic anisotropic energy Ea is made large since the absolute value of the magnetocrystalline anisotropic energy K1 is large, resulting in a decrease of the magnetic permeability $\mu'$ that is inversely proportional to Ea. Therefore, the upper limit of the absolute value of the magnetocrystalline anisotropic energy K1 should be determined so that the noise fluctuation width is suppressed to below 1 dB as well as preventing the magnetic permeability from being too small. This upper limit is determined to be 600 $J/m^3$ by judging from FIG. 4 and FIG. 5.

The $Fe_2O_3$ content where the absolute value of the magnetocrystalline anisotropic energy K1 is surely 200 $J/m^3$ or more and 600 $J/m^3$ or less is 50 to 52 mol % or 55 to 58 mol % from FIG. 4. By using a ferrite having this composition ratio for the core, the noise fluctuation width (dB) becomes 1 dB or less while the magnetic permeability and head output level are prevented from being too small.

The apparent magnetic anisotropic energy Ea is obtained by subtracting the magnetoelastic energy that is proportional to the product of stress $\sigma_{total}$ times saturation magnetorestriction $\lambda s$ from the magnetocrystalline anisotropic energy K1. This means that, not only the magnetocrystalline anisotropic energy K1 but also the magnetoelastic energy should be adjusted in order to properly adjust the apparent magnetic anisotropic energy Ea. Therefore, suppressing the noise fluctuation together with keeping a high head output level is made possible when the absolute value of the magnetoelastic energy described above is especially made small so as not to make the apparent magnetic anisotropic energy Ea too large.

Meanwhile, the saturation magnetorestriction $\lambda s$ that is one of the factors to determine the magnetoelastic energy depends on the content of $Fe_2O_3$. Since the content of $Fe_2O_3$ in the ferrite is adjusted to 50 to 52 mol % or 55 to 58 mol % in this invention, the saturation magnetorestriction $\lambda s$ is made rather larger.

Accordingly, the absolute value of stress $\sigma_{total}$ is diminished to reduce the absolute value of the magnetoelastic energy in this invention by properly adjusting the mean thermal expansion coefficient $\alpha_{ferrite}$ of ferrite that is determined by the ZnO content in the ferrite.

Figure 7:
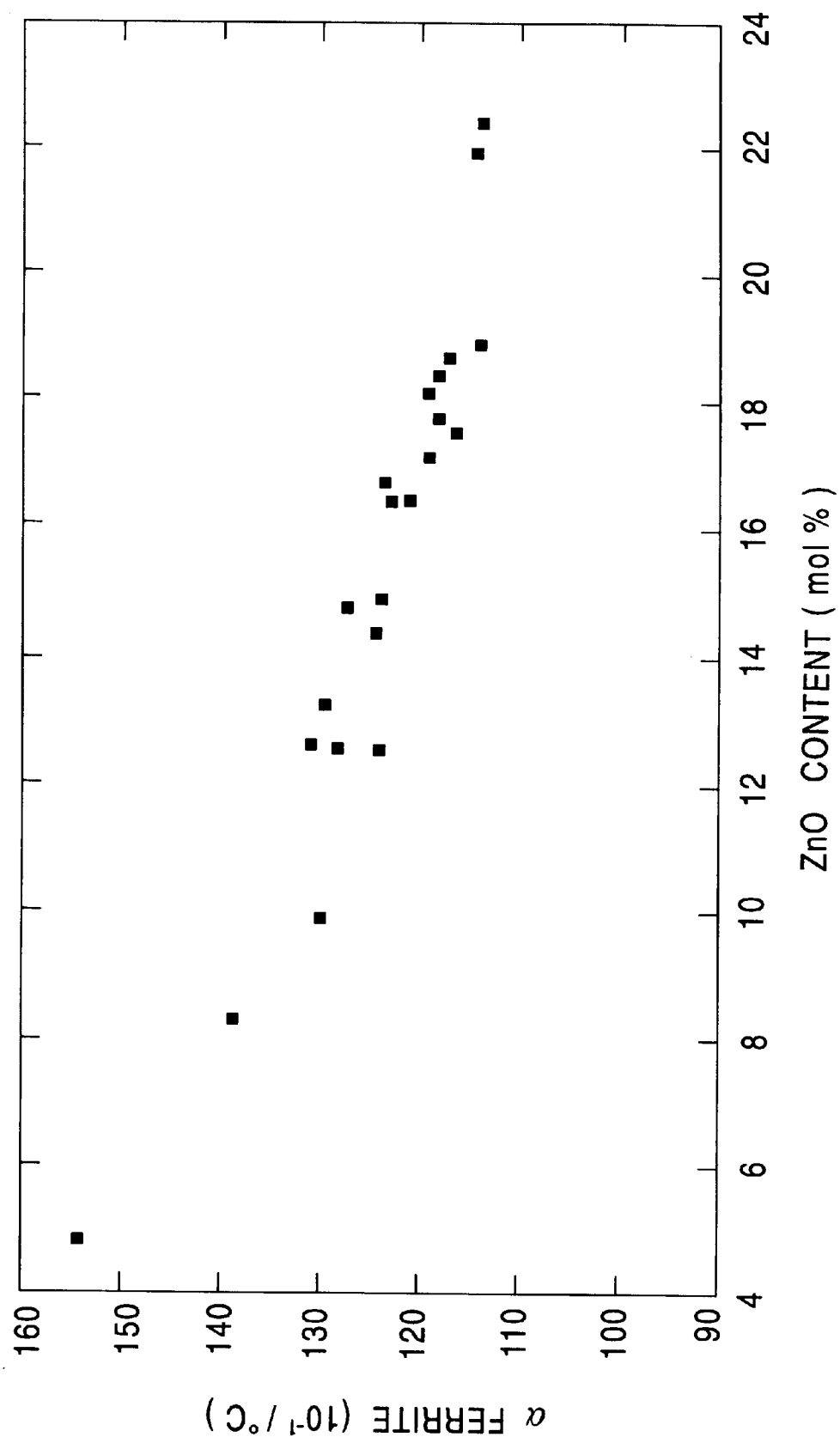
FIG. 7 is a graph showing the relation between the content of $Fe_2O_3$ in the ferrite and mean thermal expansion coefficient $\alpha_{ferrite}$ of a ferrite at a temperature of 100° C. to 300° C.

FIG. 7 is a graph showing the relation between the Zn content in the ferrite and mean thermal expansion coefficient $\alpha_{ferrite}$ of the ferrite at a temperature range of 100° C. to 300° C.

It is evident from the figure that the larger ZnO content leads to a smaller mean thermal expansion coefficient $\alpha_{ferrite}$.

While the soft magnetic materials previously described in (1) and (2) are used for the metal magnetic film 2 in this invention, it is preferable that mean thermal expansion coefficient $\alpha_{ferrite}$ of the ferrite is adjusted to a range of 120 to 140 ($10^{-7}$/° C.) by adjusting the ZnO content in the ferrite to 8 to 16 mol %. This is because, since the mean thermal expansion coefficient $\alpha_{metal}$ of the soft magnetic material is in the range of 125 ($10^{-7}$/° C.) to 150 ($10^{-7}$/° C.) at a temperature of 100° C. to 300 ° C., the difference between the mean thermal expansion coefficient $\alpha_{metal}$ of the soft magnetic material and mean thermal expansion coefficient $\alpha_{ferrite}$ can be made small if the latter is adjusted to 120 to 140 ($10^{-7}$/° C.), thereby making it possible to reduce the absolute value of stress $\sigma_{total}$.

When conventional soft magnetic materials such as sendust are used for the metal magnetic film 2, the difference between the mean thermal expansion coefficients $\alpha_{metal}$ of the soft magnetic material and $\alpha_{ferrite}$ of the ferrite can be made small if the latter is adjusted to about 115 to 120 ($10^{-7}$/° C.) by setting the amount of ZnO in the ferrite to 16 to 19 mol % since the mean thermal expansion coefficient ametal of the soft magnetic material described above is about 115 ($10^{-7}$/° C.) at 100° C. to 300° C., thereby making it possible to reduce the absolute value of stress $\sigma_{total}$.

COMPARATIVE EXAMPLE

A magnetic head as Comparative Example was produced from a single crystal ferrite core having a composition in the area of (a) in FIG. 3 comprising 53 mol % of $Fe_2O_3$ and 16 to 19 mol % of ZnO, and a metal magnetic film made of sendust. After recording carrier signals at 10 MHz several times on a recording medium, output levels (dB) at 0.1 MHz to 20 MHz were measured.

The magnetic tape used for the recording medium is a commercially available MP tape for Hi8 with a relative speed between the magnetic head and tape of 6.26 m/s. A remote contact tester was used for the measurement of the output level (dB).

Figure 8:
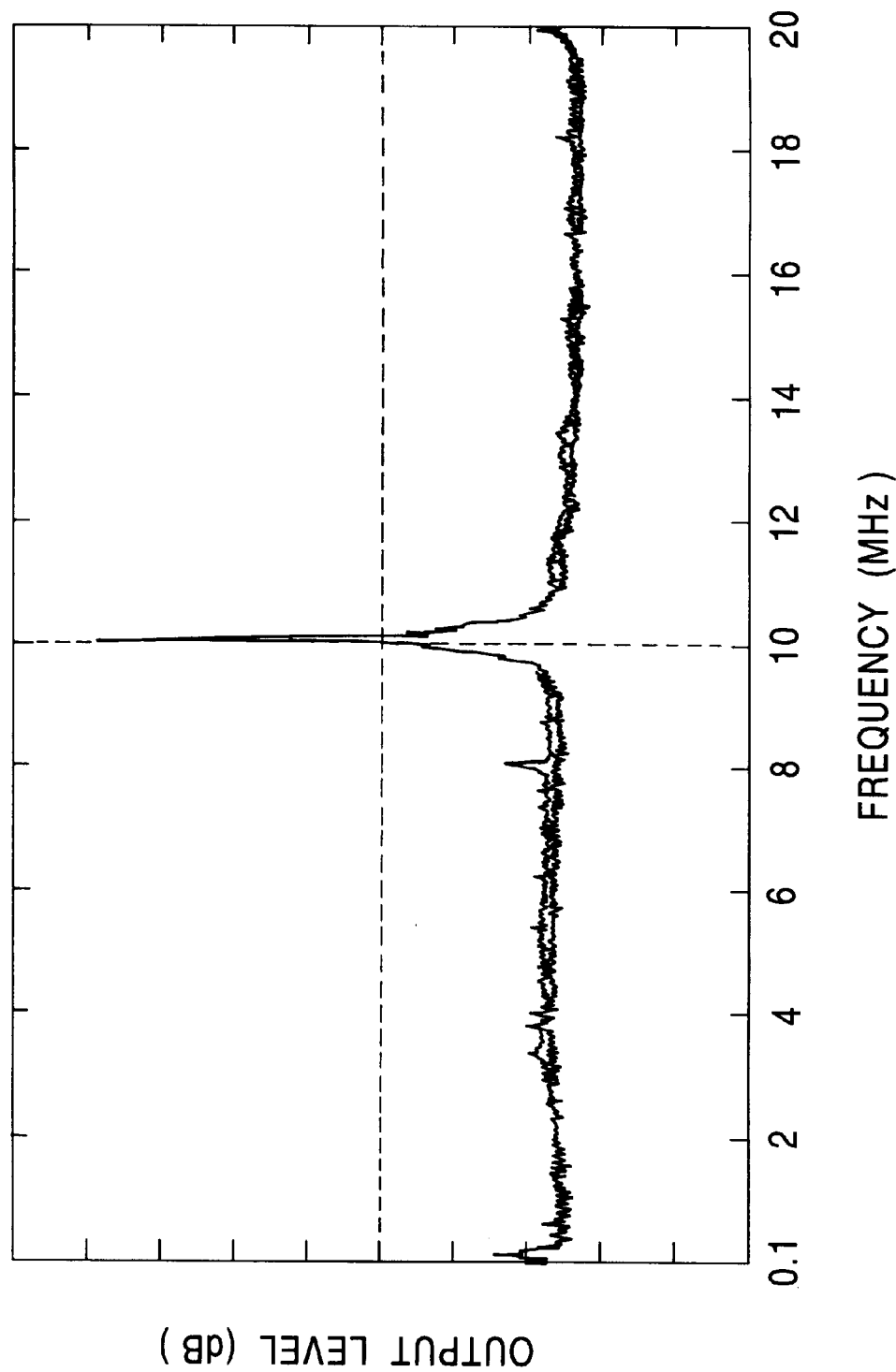
FIG. 8 is a spectrum showing the relation between frequencies and output levels (dB) when carrier signals are recorded at 10 MHz on a recording media using a magnetic head having a $Fe_2O_3$ content of 53 mol % in the ferrite.

The output levels in the frequency region of 0.1 to 20 MHz are shown in FIG. 8. One square along the vertical axis corresponds to 10 dB.

As shown in the figure, the output levels, for example, at 8 MHz show double lines.

Figure 9:
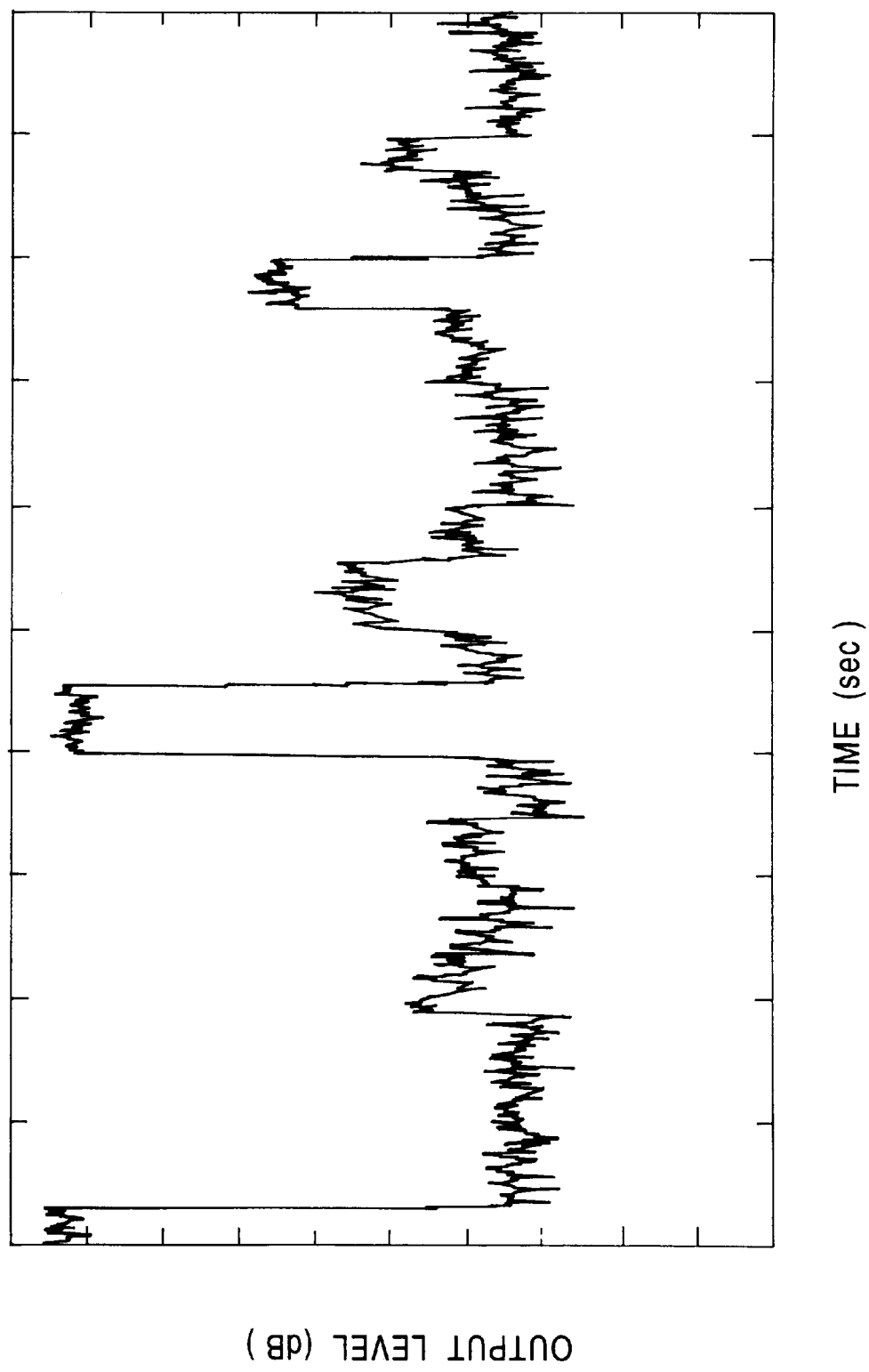
FIG. 9 is a spectrum showing the experimental result when the output level (dB) was measured for a definite time at 8 MHz in FIG. 8.

FIG. 9 is an experimental result when the output levels at 8 MHz in FIG. 8 were measured for a definite time. One square in the figure corresponds to 2 dB in this case.

As shown in the figure, the output levels (dB) are not on a continuous line but occasionally protrude. This fluctuations in the output level are recorded on the recording medium as noises, preventing a high-quality magnetic recording.

The magnetic heads of Comparative Example used for the experiments in FIG. 8 and FIG. 9 have smaller absolute values in both of the magnetocrystalline anisotropic energy K1 and saturation magnetorestriction λs as well as a smaller absolute value in stress $\sigma_{total}$, thereby resulting in a small absolute value in the apparent magnetic anisotropic energy Ea. Therefore, the polarity of Ea at the demagnetization time becomes unstable and the energy state in the magnetic head is readily fluctuated, which probably makes the noise to be liable to appear.

EXAMPLE

A magnetic head as Example was produced from a single crystal ferrite core having a composition of (b) in FIG. 3 comprising 51 mol % of $Fe_2O_3$ and 8 to 16 mol % of ZnO, and a metal magnetic film made of the soft magnetic material of (1) or (2) hitherto described. After recording carrier signals at 10 MHz on a recording medium, output levels (dB) at 8 MHz were measured. The results are shown in FIG. 10.

As is evident from the figure, the output level (dB) is nearly constant with hardly occurring noises.

Figure 10:
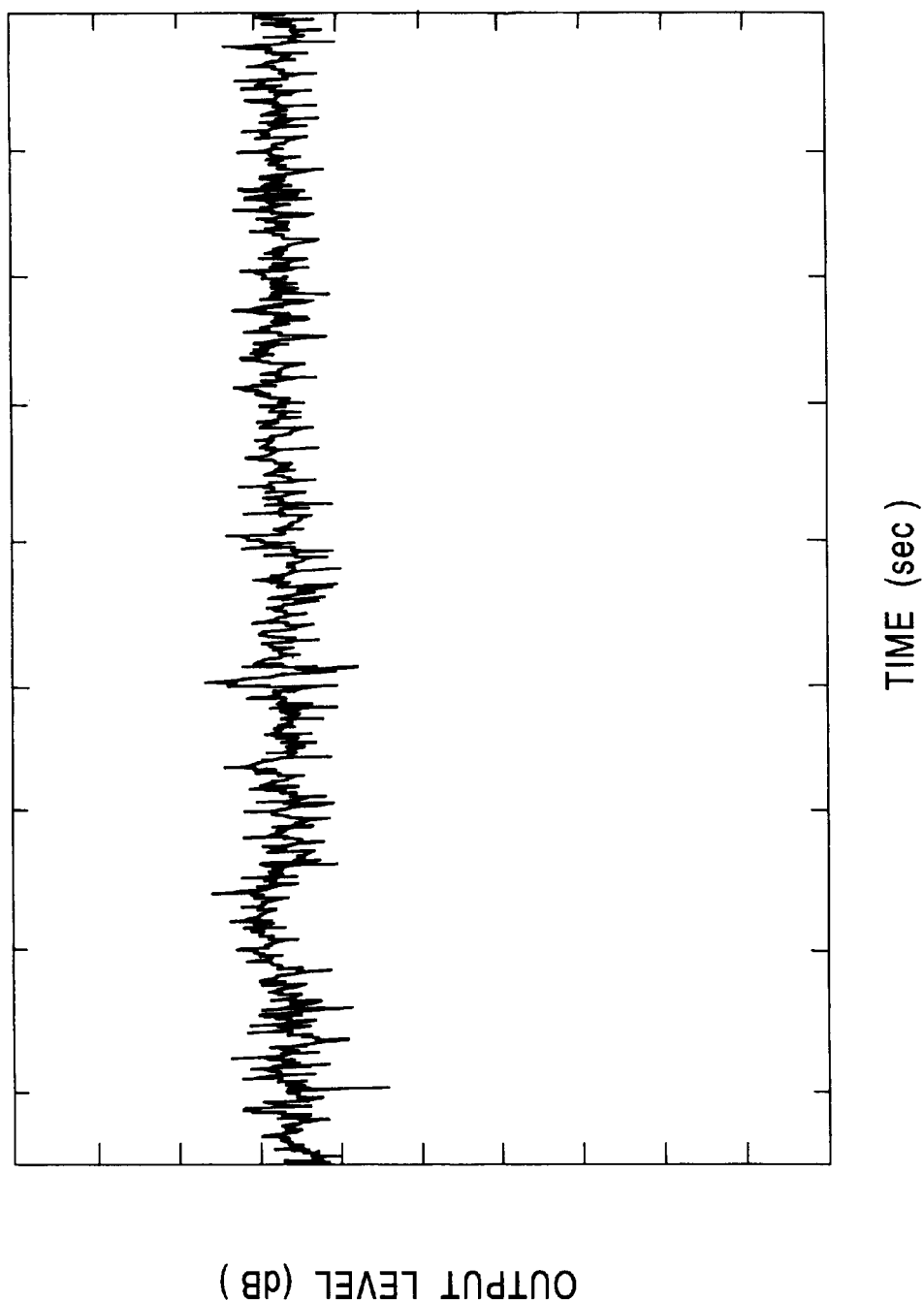
FIG. 10 is a spectrum showing the experimental result when the output level at 8 MHz was recorded for a definite time after recording carrier signals at 10 MHz on the recording media using a magnetic head having a $Fe_2O_3$ content of 51 mol % in the ferrite.
Figure 11:
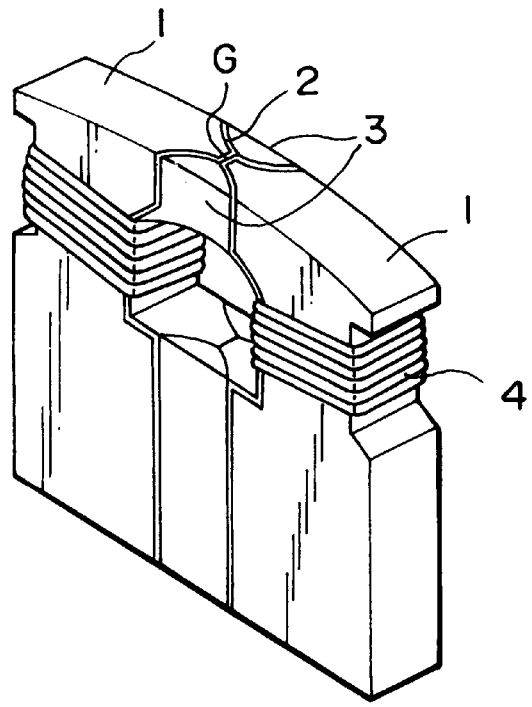
FIG. 11 is a perspective view of a conventional magnetic head.
Figure 12:
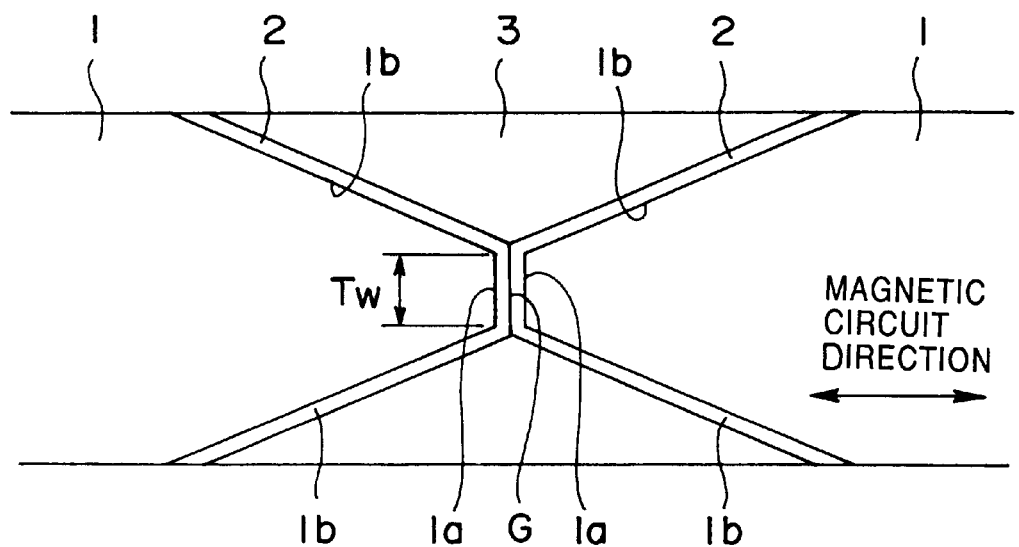
FIG. 12 is an enlarged plane view in the vicinity of the gap portion of a conventional magnetic head viewed from the rubbing surface.

In the magnetic head shown in FIG. 10, the absolute value of the apparent magnetic anisotropic energy Ea is made large by adjusting the content of $Fe_2O_3$ in the single crystal ferrite to 51 mol % to increase the magnetocrystalline anisotropic energy K1. Accordingly, the magnetic pole at the demagnetization time is stabilized so as to suppress generation of noises.

According to the present invention hitherto described, the absolute value of the apparent magnetocrystalline anisotropic energy K1 is made large by adjusting the content of $Fe_2O_3$ in the single crystal ferrite to 50 to 52 mol % or 55 to 58 mol %, thereby the absolute value of the apparent magnetic anisotropic energy is increased. Accordingly, the magnetic pole at the demagnetization time is stabilized and noise fluctuation is suppressed to a low level.

Especially, in the magnetic head having a MIG structure, the absolute value of the magnetoelastic energy is diminished by adjusting the mean thermal expansion coefficient of the ferrite to approximately the same value as that of the soft magnetic material constituting the metal magnetic film to reduce the absolute value of the magnetoelastic energy, preventing the absolute value of the apparent magnetic anisotropic energy from being too large. Accordingly, the magnetic permeability and head output level never decrease to an extremely low levels.

What is claimed is:

1. A magnetic head comprising a pair of cores separated by a magnetic gap, each of the cores having:
    a portion opposing and confronting a corresponding portion of the other core across the gap, the confronting portion formed of a magnetic material;
    an inclined face, the inclined face inclined against the portion confronting the gap; and
    an adhesive material coated on the inclined face, the adhesive material adhering the confronting portion to the inclined face,
    wherein:
        at least the confronting portion is made of a single crystal ferrite;
        the single crystal ferrite is composed of $Fe_2O_3$, MnO, and ZnO;
        the proportion of $Fe_2O_3$ in the single crystal ferrite is 50 to 52 mol % or 55 to 58 mol %; and
        the absolute value of the crystal magnetic anisotropy energy of said single crystal ferrite is in the range of 200 $J/m^3$ to 600 $J/m^3$.

2. A magnetic head according to claim 1 in which a metal magnetic film is formed with a soft magnetic material described below at a portion confronting said core, a magnetic gap is formed confronting said metal magnetic films and the content of ZnO in the ferrite is 8 to 16 mol %, wherein said soft magnetic material comprises a composition formula represented by $Fe_{(100-a-b-c-d)}\text{-}X_a\text{-}M_b\text{-}Z_c\text{-}T_d$, where X is either one of Si and Al or both of them; M is at least one kind of metal selected from the metal group comprising Zr, Hf, Nb and Ta; Z is either one of C of N or both of them; and T represents at least one kind of metal selected from the metal group comprising Cr, Ti, Re, Ru, Rh, Ni, Co, Pd, Pt and Au, wherein a, b, c, and d are in the range of $0.5 \leq a \leq 25$ (atomic %); $1 \leq b \leq 10$ (atomic %); $0.5 \leq c \leq 15$ (atomic %); and $0 \leq d \leq 10$ (atomic %), respectively, with a balance of Fe in atomic %, and contains carbides or nitride of the metal group M.

3. A magnetic head according to claim 1 in which a metal magnetic film is formed with a soft magnetic material described below at a portion confronting said core, a magnetic gap is formed confronting said metal magnetic film, and the content of ZnO in the ferrite is 8 to 16 mol %, wherein said soft magnetic material comprises a composition formula represented by $Fe_{(100-e-f-b-c-d)}\text{-}Si_e\text{-}Al_f\text{-}M_b\text{-}Z_c\text{-}T_d$, where M is at least one kind of metal selected from the metal group comprising Zr, Hf, Nb and Ta; Z is either one of C and N or both of them; and T represents at least one kind of metal selected from the metal group comprising Cr, Ti, Re, Ru, Rh, Ni, Co, Pd, Pt and Au, wherein e, f, b, c and d are in the range of $8 \leq e \leq 15$ (atomic %), $0.5 \leq f \leq 10$ (atomic %), $1 \leq b \leq 10$ (atomic %), $0.5 \leq c \leq 15$ (atomic %) and $0 \leq d \leq 10$ (atomic %), respectively, with a balance of Fe in atomic %, and contains carbides or nitride of the metal group M.

4. A magnetic head comprising a pair of cores separated by a magnetic gap, each of the cores having:
    a portion opposing and confronting a corresponding portion of the other core across the gap, the confronting portion formed of a magnetic material;
    an inclined face, the inclined face inclined against the portion confronting the gap; and an adhesive material coated on the inclined face, the adhesive material adhering the confronting portion to the inclined face, wherein:

at least the confronting portion is made of a single crystal ferrite;

said single crystal ferrite is composed of $Fe_2O_3$, MnO, and ZnO;

the proportion of $Fe_2O_3$ in the single crystal ferrite is 50 to 52 mol % or 55 to 58 mol %;

a metal magnetic film is formed at the confronting portion, the film formed of a soft magnetic material described below;

the magnetic gap confronts this metal magnetic film, the ZnO content in the ferrite is 8 to 16 mol %, and said soft magnetic material comprises a composition formula represented by $Fe_{(100-a-b-c-d)}$-$X_a$-$M_b$-$Z_c$-$T_d$, where X is either one of Si and Al or both of them; M is at least one kind of metal selected from the metal group comprising Zr, Hf, Nb and Ta; Z is either one of C and N or both of them; T represents at least one kind of metal selected from the metal group comprising Cr, Ti, Re, Ru, Rh, Ni, Co, Pd, Pt and Au; and a, b, c and d are in the range of $0.5 \leq a \leq 25$ (atomic %), $1 \leq b \leq 10$ (atomic %), $0.5 \leq c \leq 15$ (atomic %), and $0 \leq d \leq 10$ (atomic %), respectively, with a balance of Fe in atomic %, and contains carbides or nitride of the metal group M.

5. A magnetic head comprising a pair of cores separated by a magnetic gap, each of the cores having:

a portion opposing and confronting a corresponding portion of the other core across the gap, the confronting portion formed of a magnetic material;

an inclined face, the inclined face inclined against the portion confronting the gap; and an adhesive material coated on the inclined face, the adhesive material adhering the confronting portion to the inclined face, wherein:

at least the confronting portion is made of a single crystal ferrite;

said single crystal ferrite is composed of $Fe_2O_3$, MnO, and ZnO;

the proportion of $Fe_2O_3$ in the single crystal ferrite is 50 to 52 mol % or 55 to 58 mol %;

a metal magnetic film is formed at the confronting portion, the film formed of a soft magnetic material described below;

the magnetic gap confronts this metal magnetic film; the ZnO content in the ferrite is 8 to 16 mol %, and said soft magnetic material comprises a composition formula represented by $Fe_{(100-e-f-b-c-d)}$-$Si_e$-$Al_f$-$M_b$-$Z_c$-$T_d$, where M is at least one kind of metal selected from the metal group comprising Zr, Hf, Nb and Ta; Z is either one of C and N or both of them; and T represents at least one kind of metal selected from the metal group comprising Cr, Ti, Re, Ru, Rh, Ni, Co, Pd, Pt and Au, wherein e, f, b, c, and d are in the range of $8 \leq e \leq 15$ (atomic %), $0.5 \leq f \leq 10$ (atomic %), $1 \leq b \leq 10$ (atomic %), $0.5 \leq c \leq 15$ (atomic %), and $0 \leq d \leq 10$ (atomic %), respectively, with a balance of Fe in atomic %, and contains carbides or nitride of the metal group M.

6. A magnetic head in which a magnetic gap is formed by a portion confronting the gap formed by a pair of cores, at least the portion confronting the gap of which is made of a single crystal ferrite; the adhesive material for joining the confronting portion to the core is filled into side portions of the core; the single crystal ferrite is composed of $Fe_2O_3$, MnO, and ZnO; the proportion of $Fe_2O_3$ in the single crystal ferrite is 55 to 58 mol %; the adhering material for joining said confronting portion is filled into said side portion of the core; and wherein the absolute value of the crystal magnetic anisotropy energy of said single crystal ferrite is in the range of 200 $J/m^3$ to 600 $J/m^3$.

7. A magnetic head according to claim 6 in which a metal magnetic film is formed with a soft magnetic material described below at a portion confronting the core, a magnetic gap is formed confronting the metal magnetic film, and the content of ZnO in the ferrite is 8 to 16 mol %, wherein said soft magnetic material comprises a composition formula represented by $Fe_{(100-a-b-c-d)}$-$X_a$-$Y_b$-$Z_c$-$T_d$, where X is either one of Si and Al or both of them; M is at least one kind of metal selected from the metal group comprising Zr, Hf, Nb and Ta; Z is either one of C and N or both of them; and T represents at least one kind of metal selected from the metal group comprising Cr, Ti, Re, Ru, Rh, Ni, Co, Pd, Pt, and Au, wherein a, b, c, and d are in the range of $0.5 \leq a \leq 25$ (atomic %), $1 \leq b \leq 10$ (atomic %), $0.5 \leq c \leq 15$ (atomic %) and $0 \leq d \leq 10$ (atomic %), respectively, with a balance of Fe in atomic %, and contains carbides or nitride of the metal group M.

8. A magnetic head according to claim 6 in which a metal magnetic film is formed with a soft magnetic material described below at a portion confronting said core, a magnetic gap is formed confronting said metal magnetic film, and the content of ZnO in the ferrite is 8 to 16 mol %, wherein said soft magnetic material comprises a composition formula represented by $Fe_{(100-e-f-b-c-d)}$-$Si_e$-$Al_f$-$M_b$-$Z_c$-$T_d$, where M is at least one kind of metal selected from the metal group comprising Zr, Hf, Nb and Ta; Z is either one of C and N or both of them; and T represents at least one kind of metal selected from the metal group comprising Cr, Ti, Re, Ru, Rh, Ni, Co, Pd, Pt, and Au, wherein e, f, b, c, and d are in the range of $8 \leq e \leq 15$ (atomic %), $0.5 \leq f \leq 10$ (atomic %), $1 \leq b \leq 10$ (atomic %), $0.5 \leq c \leq 15$ (atomic %) and $0 \leq d \leq 10$ (atomic %), respectively, with a balance of Fe in atomic %, and contains carbides or nitride of the metal group M.

9. A magnetic head in which a magnetic gap is formed by a portion confronting the gap formed by a pair of cores, at least the portion confronting the gap of which is made of a single crystal ferrite; the adhesive material for joining this confronting portion is filled in side portions of said core; said single crystal ferrite is composed of $Fe_2O_3$, MnO, and ZnO; the proportion of $Fe_2O_3$ in the single crystal ferrite is 55 to 58 mol %; a metal magnetic film is formed at the portion confronting said core with a soft magnetic material described below; a magnetic gap is formed confronting this metal magnetic film and the ZnO content in the ferrite is 8 to 16 mol %, wherein said soft magnetic material comprises a composition formula represented by $Fe_{(100-a-b-c-d)}$-$X_a$-$M_b$-$Z_c$-$T_d$, where X is either one of Si and Al or both of them; M is at least one kind of metal selected from the metal group comprising Zr, Hf, Nb and Ta; Z is either one of C and N or both of them; and T represents at least one kind of metal selected from the metal group comprising Cr, Ti, Re, Ru, Rh, Ni, Co, Pd, Pt and Au, wherein a, b, c and d are in the range of $0.5 \leq a \leq 25$ (atomic %), $1 \leq b \leq 10$ (atomic %), $0.5 \leq c \leq 15$ (atomic %) and $0 \leq d \leq 10$ (atomic %), respectively, with a balance of Fe in atomic %, and contains carbides or nitride of the metal group M.

10. A magnetic head in which a magnetic gap is formed by a portion confronting the gap formed by a pair of cores, at least the portion confronting the gap of which is made of a single crystal ferrite, the adhesive material for joining this confronting portion is filled in side portions of said core; said single ferrite is composed of $Fe_2O_3$, MnO, and ZnO; the proportion of $Fe_2O_3$ in the single crystal ferrite is 55 to 58 mol %; a metal magnetic film is formed at the portion confronting said core by a soft magnetic material described below; a magnetic gap is formed confronting this metal magnetic film; and the ZnO content in the ferrite is 8 to 16 mol %, wherein said soft magnetic material comprises a composition formula represented by $Fe_{(100-e-f-b-c-d)}$-$Si_e$-$Al_f$-$M_b$-$Z_c$-$T_d$, where M is at least one kind of metal selected from the metal group comprising Zr, Hf, Nb and Ta; Z is either one of C and N or both of them; and T represents at least one kind of metal selected from the metal group comprising Cr, Ti, Re, Ru, Rh, Ni, Co, Pd, Pt and Au, wherein e, f, b, c, and d are in the range of $8 \leq e \leq 15$ (atomic %), $0.5 \leq f \leq 10$ (atomic %), $1 \leq b \leq 10$ (atomic %), $0.5 \leq c \leq 15$ (atomic %) and $0 \leq d \leq 10$ (atomic %), respectively, with a balance of Fe in atomic %, and contains carbides or nitride of the metal group M.

* * * * *

UNITED STATES PATENT AND TRADEMARK OFFICE
CERTIFICATE OF CORRECTION

PATENT NO. : 5,945,227
DATED : August 31, 1999
INVENTOR(S) : Hiroshi Yamagami et al.

It is certified that error appears in the above-identified patent and that said Letters Patent is hereby corrected as shown below:

<u>In the Claims</u>

In claim 2, line 10, change "of" (second occurrence) to --and--.

Signed and Sealed this

Ninth Day of May, 2000

Attest:

Q. TODD DICKINSON

*Attesting Officer*  *Director of Patents and Trademarks*